(12) United States Patent
Kato

(10) Patent No.: US 6,723,009 B2
(45) Date of Patent: Apr. 20, 2004

(54) THREE-PIECE SOLID GOLF BALL

(75) Inventor: Akira Kato, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/180,482

(22) Filed: Jun. 27, 2002

(65) Prior Publication Data

US 2003/0064828 A1 Apr. 3, 2003

(30) Foreign Application Priority Data

Jun. 28, 2001 (JP) ........................... 2001-196424

(51) Int. Cl.$^7$ .................. A63B 37/04; A63B 37/06
(52) U.S. Cl. ........................ 473/374; 473/371
(58) Field of Search ................... 473/351–377

(56) References Cited

U.S. PATENT DOCUMENTS

| 5,072,944 A | * 12/1991 | Nakahara et al. ........... 473/373 |
| 5,143,957 A | * 9/1992 | Hashimoto et al. ......... 524/397 |
| 5,711,723 A | 1/1998 | Hiraoka et al. |
| 5,830,085 A | 11/1998 | Higuchi et al. |
| 5,872,185 A | * 2/1999 | Ichikawa et al. .............. 525/93 |
| 6,120,392 A | * 9/2000 | Kashiwagi et al. ......... 473/374 |
| 6,180,722 B1 | * 1/2001 | Dalton et al. ................ 525/193 |
| 6,248,029 B1 | 6/2001 | Maruko |
| 6,319,155 B1 | * 11/2001 | Moriyama et al. .......... 473/378 |
| 6,544,131 B1 | * 4/2003 | Sano et al. .................. 473/374 |
| 6,551,202 B1 | * 4/2003 | Yoshida ....................... 473/376 |

FOREIGN PATENT DOCUMENTS

| JP | 8-332247 A | 12/1996 |
| JP | 9-313643 A | 12/1997 |
| JP | 11-151320 A | 6/1999 |

* cited by examiner

Primary Examiner—Gregory Vidovich
Assistant Examiner—Alvin A. Hunter, Jr.
(74) Attorney, Agent, or Firm—Birch, Stewart, Kolasch & Birch, LLP

(57) ABSTRACT

The present invention provides a three-piece solid golf ball having long flight distance when hit by using from a middle iron club to a driver, and excellent controllability by accomplishing high spin amount when hit by a short iron club and the like, while maintaining good shot feel. The present invention relates to a three-piece solid golf ball comprising a core composed of a center and an intermediate layer formed on the center, and a cover formed on the core, wherein the center has a diameter of 10 to 20 mm and a central point hardness in JIS-A hardness of 30 to 90, the intermediate layer has a surface hardness in Shore D hardness of 50 to 70, and the cover has a Shore D hardness of 45 to 65.

11 Claims, 1 Drawing Sheet

THREE-PIECE SOLID GOLF BALL

FIELD OF THE INVENTION

The present invention relates to a three-piece solid golf ball. More particularly, it relates to a three-piece solid golf ball having long flight distance when hit by using from a middle iron club to a driver, and excellent controllability by accomplishing high spin amount when hit by a short iron club and the like, while maintaining good shot feel.

BACKGROUND OF THE INVENTION

Solid golf balls, which have good rebound characteristics and small spin amount, are generally approved of or employed by most of general amateur golfers, who regard flight distance as most important characteristics of golf ball. On the other hand, professional golfers and high level golfers regard controllability as most important, followed by soft and good shot feel, and flight performance. Therefore they have mainly employed thread wound golf balls, because they regard controllability as most important and the golf ball has soft and good shot feel. However, it is problem that the thread wound golf ball has a structure, which is easy to apply spin, and it has high spin amount when hit by every golf club, which degrades the flight performance. In order to solve the problem, many solid golf balls, of which the shot feel and flight performance are improved while maintaining good controllability, have been proposed (Japanese Patent Kokai Publication Nos. 332247/1996, 313643/1997, 151320/1999 and the like).

In Japanese Patent Kokai Publications No. 332247/1996, a three-piece solid golf ball which comprises a two-layer structured core composed of an inner core and outer core, and a cover is described. The inner core has a diameter of 25 to 37 mm, has a center hardness in JIS-C hardness of 60 to 85 and has a hardness difference from the center of the inner core to the surface of the inner core is within the range of not more than 4, the outer core has a surface hardness in JIS-C hardness of 75 to 90, and the cover has a flexural modulus of 1,200 to 3,600 kg/cm².

In Japanese Patent Kokai Publications No. 313643/1997, a three-piece solid golf ball, of which an intermediate layer formed from thermoplastic resin is placed between a core and a cover is described. The core has a center hardness in JIS-C hardness of not more than 75 and has a surface hardness in JIS-C hardness of not more than 85, the surface hardness is higher than the center hardness by 5 to 25, a hardness of the intermediate layer is higher than the surface hardness of the core by less than 10, and a hardness of the cover is higher than the hardness of the intermediate layer.

In Japanese Patent Kokai Publication No. 151320/1999, a three-piece solid golf ball which comprises a two-layer structured core composed of an inner core and outer core, and a cover is described. The inner core has a diameter of 15 to 22 mm and Shore D hardness of 40 to 70, the outer core has a JIS-C hardness of 40 to 75, the inner core and outer core are formed from rubber composition, and the cover has a thickness of 0.5 to 3 mm;

However, in the golf balls described above, spin amount is large when hit by using from a driver to a middle iron club, where long flight distance is still required, and the flight distance is reduced. In addition, if the flight distance will be improved, shot feel is hard or heavy, and poor. Therefore, a golf ball having sufficient performances has not been obtained.

OBJECTS OF THE INVENTION

A main object of the present invention is to provide a three-piece solid golf ball, of which flight distance is long when hit by using from a middle iron club to a driver; spin amount is large when hit by a short iron shot and the like, and the controllability is excellent; while maintaining good shot feel at the time of hitting as good as thread golf balls.

According to the present invention, the object described above has been accomplished by providing a three-piece solid golf ball comprising a core having a two-layered structure, which is composed of a center and an intermediate layer, and a cover, and adjusting a diameter and central point hardness of the center, a surface hardness of the intermediate layer and a hardness of the cover to specified ranges, thereby providing a three-piece solid golf ball, of which flight distance is long when hit by using from a middle iron club to a driver; spin amount is large when hit by a short iron shot and the like, and the controllability is excellent; while maintaining good shot feel at the time of hitting as good as thread golf balls.

This object as well as other objects and advantages of the present invention will become apparent to those skilled in the art from the following description with reference to the accompanying drawings.

BRIEF EXPLANATION OF DRAWINGS

The present invention will become more fully understood from the detailed description given hereinbelow and the accomplishing drawings which are given by way of illustrating only, and thus are not limitative of the present invention, and wherein.

SUMMARY OF THE INVENTION

Figure 1:
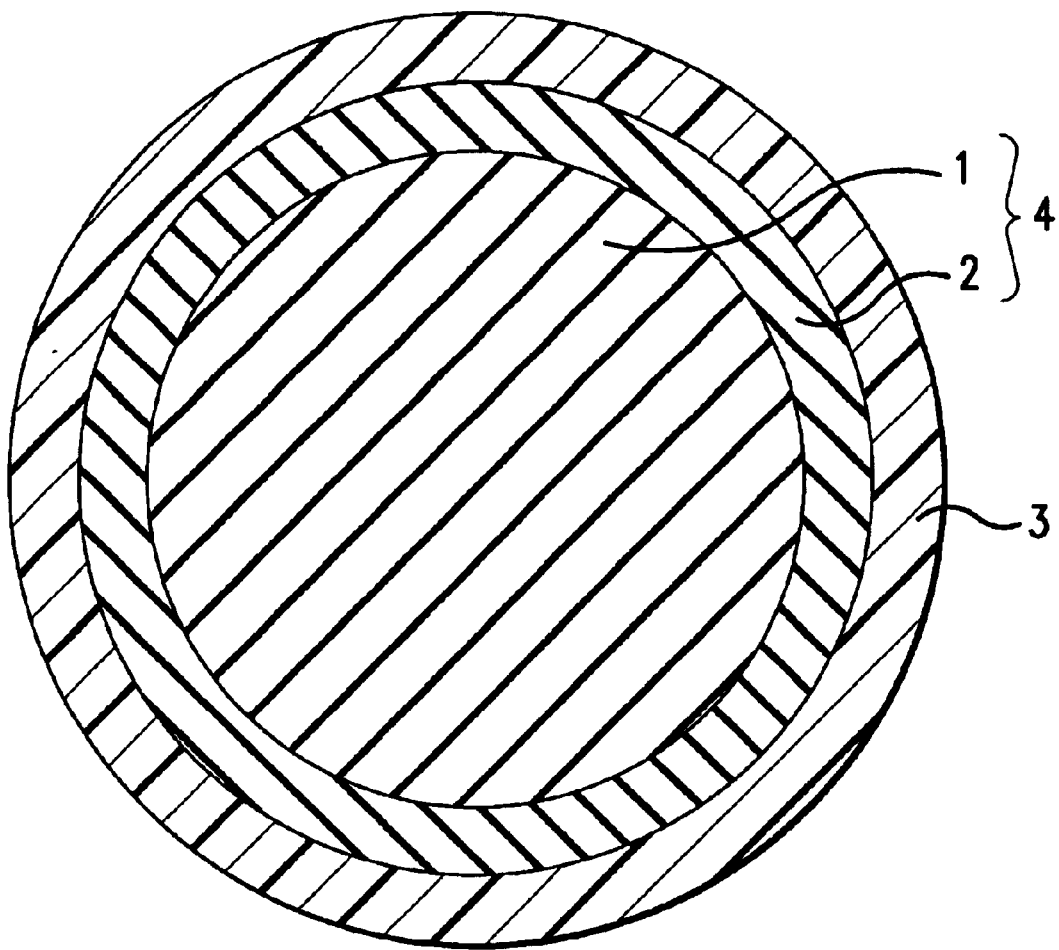
FIG. 1 is a schematic cross section illustrating one embodiment of the golf ball of the present invention.

The present invention provides a three-piece solid golf ball comprising a core composed of a center and an intermediate layer formed on the center, and a cover formed on the core, wherein the center has a diameter of 10 to 20 mm and a central point hardness in JIS-A hardness of 30 to 90, the intermediate layer has a surface hardness in Shore D hardness of 50 to 70, and the cover has a Shore D hardness of 45 to 65.

In the conventional three-piece golf ball, since a center harder than that of the present invention is used, it is required to use a material harder than the center as a intermediate layer, and the resulting golf ball is hard. Therefore, a diameter of the center, which is large, is within the range of 25 to 41 mm. A deformation amount of the golf ball when hit by a middle iron club to a driver is small and the spin amount is large, and the flight distance is not sufficiently obtained. There has been golf balls having small diameter of the center, but the target therefor is a player who swings the golf club at low head speed, and then the deformation amount when hit at low head speed is large. Therefore, the hardness of the intermediate layer is low and the central point hardness of the center is high, and the spin amount when hit by a middle iron club to a driver is large, which reduces the flight distance. Since the hardness of the intermediate layer is low, the rebound characteristics are not sufficiently obtained, which reduces the flight distance. In addition, the shot feel is poor such that the rebound characteristics are poor.

The present inventors have developed a three-piece solid golf ball in different point of view from the conventional point, which the hardness at the distance of 5 to 10 mm from the central point of the center has great effect on the restraint of the spin amount when hit by a middle iron club to a driver. Thereby the three-piece solid golf ball is accomplished by decreasing the diameter and hardness of the center, of which the spin amount is small when hit by a middle iron club to a driver to improve the flight distance, of which the spin amount is large when hit by a short iron club and the like to reduce the flight distance, and the controllability is excellent, and of which the shot feel is good.

In order to put the present invention into a more suitable practical application, it is desired that the cover be formed from a cover composition comprising as a base resin a heat mixture of
(a) ionomer resin, and
(b) thermoplastic elastomer selected from the group consisting of styrene-based thermoplastic elastomer, polyolefin-based thermoplastic elastomer, polyurethane-based thermoplastic elastomer, polyester-based thermoplastic elastomer, polyamide-based thermoplastic elastomer and mixtures of at least one thereof;

the cover be formed from a cover composition comprising
(a) 10 to 80 parts by weight of ethylene-(meth)acrylic acid copolymer ionomer resin,
(b) 0 to 60 parts by weight of ethylene-(meth)acrylic acid-(meth)acrylic ester terpolymer ionomer resin, and
(c) 5 to 60 parts by weight of styrene-based thermoplastic elastomer, based on 100 parts by weight of a base resin; and the styrene-based thermoplastic elastomer be selected from the group consisting of styrene-butadiene-styrene block copolymer (SBS); styrene-isoprene-styrene block copolymer (SIS); styrene-isoprene-butadiene-styrene block copolymer (SIBS); hydrogenation product thereof; and a polymer alloy of an olefin therewith.

DETAILED DESCRIPTION OF THE INVENTION

The multi-piece solid golf ball of the present invention will be explained with reference to the accompanying drawing in detail. FIG. 1 is a schematic cross section illustrating one embodiment of the multi-piece solid golf ball of the present invention. As shown in FIG. 1, the golf ball of the present invention comprises a core 4 consisting of a center 1 and an intermediate layer 2 formed on the center 1, and a cover 3 covering the core 4. The core 4, including both the center 1 and the intermediate layer 2, is obtained by press-molding a rubber composition under applied heat using a method and condition, which has been conventionally used for preparing solid cores of golf balls. The rubber composition essentially contains a base rubber, a co-crosslinking agent, an organic peroxide, a filler, optionally an antioxidant and the like.

The base rubber used for the core 4 of the present invention may be natural rubber and/or synthetic rubber, which has been conventionally used for cores of solid golf balls. Preferred is high-cis polybutadiene rubber containing a cis-1, 4 bond of not less than 40%, preferably not less than 80%. The high-cis polybutadiene rubber may be optionally mixed with natural rubber, polyisoprene rubber, styrene-butadiene rubber, ethylene-propylene-diene rubber (EPDM) and the like.

The co-crosslinking agent can be α, β-unsaturated carboxylic acids having 3 to 8 carbon atoms (e.g. acrylic acid, methacrylic acid, etc.) or a metal salt thereof, including mono or divalent metal salts, such as zinc or magnesium salts; a functional monomer such as trimethylolpropane trimethacrylate; or mixtures thereof. The preferred co-crosslinking agent is zinc acrylate because it imparts high rebound characteristics to the resulting golf ball. The amount of the co-crosslinking agent is from 5 to 20 parts by weight, preferably from 6 to 18 parts by weight in the center 1, and from 30 to 50 parts by weight, preferably from 32 to 48 parts by weight in the intermediate layer 2, based on 100 parts by weight of the base rubber. When the amount of the co-crosslinking agent is smaller than 5 parts by weight in the center and 30 parts by weight in the intermediate layer, the core is too soft, and the rebound characteristics are degraded, which reduces the flight distance. In addition, since the cover is formed from soft material, the resulting golf ball is too soft, and the shot feel is poor. On the other hand, when the amount of the co-crosslinking agent is larger than 20 parts by weight in the center and 50 parts by weight in the intermediate layer, the core is too hard, and the shot feel is poor.

The organic peroxide includes, for example, dicumyl peroxide, 1,1-bis (t-butylperoxy)-3,3,5-trimethylcyclohexane, 2,5-dimethyl-2,5-di(t-butylperoxy) hexane, di-t-butyl peroxide and the like. The preferred organic peroxide is dicumyl peroxide. The amount of the organic peroxide in both the center and the intermediate layer is from 0.5 to 5.0 parts by weight, preferably 0.7 to 4.0 parts by weight, based on 100 parts by weight of the base rubber. When the amount of the organic peroxide is smaller than 0.5 parts by weight, the core is too soft, and the rebound characteristics are degraded, which reduces the flight distance. On the other hand, when the amount of the organic peroxide is larger than 5.0 parts by weight, the core is too hard, and the shot feel is poor.

The filler, which can be typically used for the core of solid golf ball, includes for example, inorganic filler (such as zinc oxide, barium sulfate, calcium carbonate, magnesium oxide and the like), high specific gravity metal powder filler (such as tungsten powder, molybdenum powder and the like), and the mixture thereof. The amount of the filler is from 10 to 30 parts by weight, preferably from 12 to 25 parts by weight in the center 1, and from 4 to 20 parts by weight, preferably from 5 to 18 parts by weight in the intermediate layer 2, based on 100 parts by weight of the base rubber. When the amount of the filler is smaller than 10 parts by weight in the center and 4 parts by weight in the intermediate layer, it is required to add a large amount of filler to the cover in order to adjust the weight of the resulting golf ball to a proper range. Therefore the rebound characteristics of the resulting golf ball are degraded. On the other hand, when the amount of the filler is larger than 30 parts by weight in the center and 20 parts by weight in the intermediate layer, the weight of the core is too large, and it is difficult to adjust the weight of the resulting golf ball to a proper range.

The rubber compositions for the center 1 and intermediate layer 2 of the golf ball of the present invention can contain other components, which have been conventionally used for preparing the core of solid golf balls, such as organic sulfide compound, antioxidant and the like. If used, the amount of the other components is from 0.5 to 5.0 parts by weight, preferably 0.7 to 4.0 parts by weight, based on 100 parts by weight of the base rubber.

The center 1 used in the present invention is obtained by mixing the above rubber composition, and then vulcanizing and press-molding the mixture in a mold. The vulcanization may be conducted, for example, by press molding in a mold at 130 to 180° C. and 2.9 to 9.8 MPa for 15 to 60 minutes.

In the golf ball of the present invention, it is required for the center 1 to have a diameter of 10 to 20 mm, preferably 12 to 19 mm, more preferably 14 to 16 mm. When the diameter of the center 1 is smaller than 10 mm, the spin amount at the time of hitting is increased, and the golf ball creates blown-up trajectory, which reduces the flight distance. On the other hand, when the diameter is larger than 20 mm, the resulting golf ball is too soft, and the rebound characteristics are degraded. In addition, the shot feel is poor such that the rebound characteristics are poor.

In the golf ball of the present invention, it is required for the center 1 to have a central point hardness in JIS-A hardness of 30 to 90, preferably 35 to 88, more preferably 40 to 85, most preferably 48 to 81. When the central point hardness of the center 1 is lower than 30, the rebound characteristics of the center are degraded, and the rebound characteristics of the resulting golf ball are degraded, which reduces the flight distance. On the other hand, when the central point hardness is higher than 90, the technical effects of retraining the spin amount at the time of hitting are not sufficiently obtained. In addition, the shot feel is hard and poor. The term "a central point hardness of the center 1" as used herein refers to the hardness, which is obtained by cutting the center into two equal parts and then measuring a hardness at the central point in section.

In the golf ball of the present invention, it is desired for the center 1 to have a surface hardness in JIS-A hardness of 30 to 95, preferably 35 to 93, more preferably 40 to 90, most preferably 50 to 85. When the surface hardness of the center 1 is lower than 30, the rebound characteristics of the center is too low, and the rebound characteristics of the resulting golf ball are degraded, which reduces the flight distance. On the other hand, when the surface hardness of the center 1 is higher than 95, the center is too hard, and the shot feel of the resulting golf ball is hard and poor. In addition, the technical effects of retraining the spin amount at the time of hitting are not sufficiently obtained. The term "a surface hardness of the center 1" as used herein refers to the hardness, which is determined by measuring a hardness at the surface of the resulting center.

The intermediate layer 2 is then covered on the center 1 to form the core 4. A method of covering the center 1 with the intermediate layer 2 is not specifically limited, but may be conventional methods, which have been known to the art and used for forming the two-layer structured core of the golf balls. For example, there can be used a method comprising uniformly mixing the composition for the intermediate layer, coating on the center 1 into a concentric sphere, followed by pressure molding in a mold at 130 to 180° C. for 10 to 40 minutes; or a method comprising molding the composition for the intermediate layer into a semi-spherical half-shell in advance, covering the center 1 with the two half-shells, followed by pressure molding at 130 to 180° C. for 10 to 40 minutes.

In the golf ball of the present invention, it is desired for the intermediate layer 2 to have a thickness of 9.5 to 15.0 mm, preferably 10.5 to 14.0 mm, more preferably 11.0 to 13.0 mm. When the thickness of the intermediate layer 2 is smaller than 9.5 mm, the rebound characteristics of the resulting golf ball are degraded, which reduces the flight distance. On the other hand, when the thickness is larger than 15.0 mm, since the intermediate layer is formed from hard material, the shot feel of the resulting golf ball is hard and poor.

In the golf ball of the present invention, it is required for the intermediate layer 2 to have a surface hardness in Shore D hardness of 50 to 70, preferably 52 to 68, more preferably 55 to 67, most preferably 62 to 67. When the surface hardness of the intermediate layer 2 is smaller than 50, the core is too soft, and it is difficult to adjust the hardness of the resulting golf ball to a proper range. On the other hand, when the hardness is larger than 70, the intermediate layer is too hard, and the shot feel is poor. In addition, the spin amount at the time of hitting is increased, which reduces the flight distance. The term "a hardness of the intermediate layer 2" as used herein, means the surface hardness of the core having a two-layered structure, which is formed by integrally press-molding the center and the intermediate layer.

In the golf ball of the present invention, the core 4 has a diameter of 37 to 43 mm, preferably 38 to 42 mm, more preferably 39 to 41. When the diameter of the core is smaller than 37 mm, it is required to increase the thickness of the cover in order to adjust the diameter of the resulting golf ball to diameter conformed to the regulations for golf balls, and the spin amount when hit by a driver is large, which reduces the flight distance. On the other hand, when the diameter of the inner core is larger than 43 mm, the diameter of the resulting golf ball is too large, and air resistance when flying is large, which reduces the flight distance.

In the golf ball of the present invention, it is desired for the core 4 to have a deformation amount when applying from an initial load of 98 N to a final load of 1275 N of 2.4 to 3.6 mm, preferably 2.6 to 3.4 mm, more preferably 2.8 to 3.2 mm. When the deformation amount of the core 4 is smaller than 2.4 mm, the deformation amount of the resulting golf ball when hit by a driver to middle iron club is small, and the spin amount is increased, which reduces the flight distance. On the other hand, when the deformation amount is larger than 3.6 mm, the core is too soft, and the rebound characteristics of the resulting golf ball are degraded, which reduces the flight distance. In addition, the shot feel is too soft and poor.

The cover 3 is then covered on the core 4. In the golf ball of the present invention, it is desired for the cover 3 to have a thickness of 0.5 to 2.0 mm, preferably 0.7 to 1.8 mm, more preferably 1.0 to 1.5 mm. When the thickness is smaller than 0.5 mm, the technical effects of softening the cover are not sufficiently obtained, and the spin amount at short iron shot to approach shot is small, which degrades the controllability. On the other hand, when the thickness is larger than 2.0 mm, the spin amount at the time of hitting is increased, and the golf ball creates blown-up trajectory, which reduces the flight distance.

In the golf ball of the present invention, it is required for the cover 3 to have a hardness in Shore D of 45 to 65, preferably 47 to 63, more preferably 50 to 60. When the cover hardness is lower than 45, the cover is too soft, and the spin amount when hit by a driver and the like is increased. Therefore, the golf ball creates blown-up trajectory, which reduces the flight distance. On the other hand, when the cover hardness is higher than 65, the cover is too hard, and the impact force at the time of hitting is large, which degrades the shot feel. In addition, the spin amount at approach shot is small, and the durability is poor. The cover hardness as used herein is determined by measuring a Shore D hardness at the surface of the resulting golf ball.

In the golf ball of the present invention, it is desired for the cover 3 to be formed from a heat mixture of a cover composition comprising (a) ionomer resin, and (b) thermoplastic elastomer selected from the group consisting of styrene-based thermoplastic elastomer, polyolefin-based thermoplastic elastomer, polyurethane-based thermoplastic elastomer, polyester-based thermoplastic elastomer, polyamide-based thermoplastic elastomer and mixture thereof.

In the golf ball of the present invention, it is desired for the cover 3 to be formed from a cover composition comprising
(a) 10 to 80 parts by weight of ethylene-(meth)acrylic acid copolymer ionomer resin,
(b) 0 to 60 parts by weight of ethylene-(meth)acrylic acid-(meth)acrylic ester terpolymer ionomer resin, and
(c) 5 to 60 parts by weight of styrene-based thermoplastic elastomer, based on 100 parts by weight of a base resin.

In the golf ball of the present invention, the (a) component of the cover composition is ethylene-acrylic acid copolymer ionomer resin and/or ethylene-methacrylic acid copolymer ionomer resin. As a composition ratio of the ethylene to acrylic acid or methacrylic acid in the ionomer resin, it is preferable for the ionomer resin to comprise 70 to 95% by weight of the ethylene and 5 to 30% by weight of the acrylic acid or methacrylic acid. The ionomer resin is partially neutralized with metal salt, and crosslinked with metal ion. That is, at least a portion of carboxylic acid groups in the copolymer of ethylene and acrylic acid or methacrylic acid is neutralized and crosslinked with metal ion. Examples of the metal ion include alkaline metal ion, such as sodium ion, potassium ion, lithium ion and the like; divalent metal ion, such as zinc ion, calcium ion, magnesium ion and the like; trivalent metal ion, such as aluminum ion, neodymium ion and the like; and the mixture thereof. Preferred are sodium ion, zinc ion, lithium ion and the like, in view of rebound characteristics, durability and the like.

The (a) component is preferably high stiffness type ionomer resin having a Shore D hardness of 55 to 70, preferably 57 to 68, and a flexural modulus of 200 to 500 MPa, preferably 250 to 450 MPa.

Examples of the ionomer resin will be shown by a trade name thereof. Examples of the ionomer resin, which is commercially available from Mitsui Du Pont Polychemicals Co., Ltd. include Hi-milan 1555 (Na), Hi-milan 1557 (Zn), Hi-milan 1605 (Na), Hi-milan 1706 (Zn), Hi-milan 1707 (Na), Hi-milan AM7318 (Na), Hi-milan AM7315 (Zn), Hi-milan AM7317 (Zn), Hi-milan AM7311 (Mg) and Hi-milan MK7320 (K) and the like.

Examples of the ionomer resin, which is commercially available from Du Pont Co., include Surlyn 8945 (Na), Surlyn 8940 (Na), Surlyn 9910 (Zn), Surlyn 9945 (Zn), Surlyn 7930 (Li) and Surlyn 7940 (Li) and the like. Examples of the ionomer resin, which is commercially available from Exxon Chemical Co., include Iotek 7010 (Zn), Iotek 8000 (Na), Iotek 7030 (Zn), Iotek 8030 (Na) and the like.

Incidentally, Na, Zn, K, Li and Mg, which are described in parentheses after the trade name of the above ionomer resin, indicate their neutralizing metal ion species. These ionomer resins may be used alone or in combination of two or more thereof, or a mixture of one or more of the ionomer resin obtained by neutralizing with monovalent metal ion and the ionomer resin obtained by neutralizing with divalent metal ion, as the base resin of the cover in the present invention.

In the golf ball of the present invention, the (b) component of the cover composition is ethylene-acrylic acid or methacrylic acid-acrylic ester or methacrylic ester terpolymer ionomer resin. As a composition ratio of the three components in the ionomer resin, it is desired for the ionomer resin to comprise 70 to 85% by weight of ethylene, 5 to 20% by weight of (meth)acrylic acid and 10 to 25% by weight of (meth)acrylic ester. Examples of the (meth)acrylic ester in the ionomer include methyl ester, ethyl ester, propyl ester, n-butyl ester, isobutyl ester and the like. In case of the ionomer resin, at least a portion of carboxylic acid groups in the terpolymer is neutralized and crosslinked with the metal ion, as described in the (a) component. Examples of the metal ion include the same metal ions as described in the (a) component.

Examples of the terpolymer ionomer resin will be shown by a trade name thereof. Examples of the ionomer resin, which is commercially available from Mitsui Du Pont Polychemicals Co., Ltd., include Hi-milan 1856 (Na), Hi-milan 1855 (Zn), Hi-milan AM7316 (Zn) and the like. Examples of the ionomer resin, which is commercially available from Du Pont Co., include Surlyn 8320 (Na), Surlyn 9320 (Zn), Surlyn 6320 (Mg) and the like. Examples of the ionomer resin, which is commercially available from Exxon Chemical Co., include Iotek 7510 (Zn), Iotek 7520 (Zn) and the like.

It is desired for the (b) component to have a Shore D of 30 to 55, preferably 35 to 50, and a flexural modulus of 10 to 100 MPa, preferably 15 to 80 MPa. It is for the reason that the technical effects of promoting the compatibility between the (a) and (c) components are easily accomplished.

In the golf ball of the present invention, it is desired for the base resin of the cover 3 to compound at least one styrene-based thermoplastic elastomer as the (c) component with the ionomer resin as the (a) and (b) components. The styrene-based thermoplastic elastomer includes thermoplastic elastomer having styrene block, that is, block copolymers having styrene block and conjugated diene compound block. Examples of the conjugated diene compounds include butadiene, isoprene, 1,3-pentadiene, 2,3-dimethyl-1,3-butadiene and the like, or mixtures thereof. Preferred are butadiene, isoprene and combinations thereof.

The styrene-based thermoplastic elastomer as the (c) component can be styrene-butadiene-styrene block copolymer (SBS); styrene-isoprene-styrene block copolymer (SIS); styrene-isoprene-butadiene-styrene block copolymer (SIBS); or hydrogenation product thereof. That is, the styrene-based thermoplastic elastomer as the (c) component can be the SBS or hydrogenation product thereof; the SIS or hydrogenation product thereof; or the SIBS or hydrogenation product thereof. As the hydrogenation product of the SBS, for example, styrene-ethylene-butylene-styrene block copolymer (SEBS) obtained by hydrogenating double bond of butadiene portion in SBS may be used. As the hydrogenation product of the SIS, for example, styrene-ethylene-propylene-styrene block copolymer (SEPS) obtained by hydrogenating double bond of isoprene portion in SIS may be used. As the hydrogenation product of the SIBS, for example, styrene-ethylene-ethylene-propylene-styrene block copolymer (SEEPS) obtained by hydrogenating double bond of butadiene portion or isoprene portion in SIBS may be used.

The styrene-based thermoplastic elastomer as the (c) component can be polymer alloys of
olefin; and
styrene-butadiene-styrene block copolymer (SBS), hydrogenation product of SBS, styrene-isoprene-styrene block copolymer (SIS), hydrogenation product of SIS, styrene-isoprene-butadiene-styrene block copolymer (SIBS), or hydrogenation product of SIBS.

Examples of the thermoplastic elastomer having styrene block include styrene-butadiene-styrene block copolymer (SBS); styrene-ethylene-butylene-styrene block copolymer (SEBS), of which the double bond in the butadiene portion of the SBS is hydrogenated; styrene-isoprene-styrene block copolymer (SIS); styrene-ethylene-propylene-styrene block copolymer (SEPS), of which the double bond in the isoprene portion of the SIS is hydrogenated; styrene-isoprene-butadiene-styrene block copolymer (SIBS); styrene-ethylene-ethylene-propylene-styrene block copolymer (SEEPS), of which the double bond in butadiene portion or isoprene portion of SIBS; and modification thereof.

A styrene content in the SBS, SEBS, SIS and SEPS is within the range of 10 to 50% by weight, preferably 15 to 45% by weight, based on the weight of the copolymer. When the styrene content is smaller than 10% by weight, the thermoplastic elastomer is too soft, and the cut resistance is degraded. On the other hand, when the styrene content is larger than 50% by weight, the technical effect of softening the cover accomplished by compounding the thermoplastic elastomer with the ionomer resin as the (a) component is not sufficiently obtained. Therefore, the shot feel and controllability are degraded.

In the present invention, the SBS, the SEBS, the SIS and the SEPS may have epoxy groups in a portion of the block copolymer. The wording "styrene-butadiene-styrene block copolymer (SBS) containing epoxy groups" as used herein means block copolymer in which polybutadiene block containing epoxy groups is sandwiched by two polystyrene blocks, and may be the block copolymer, of which a portion or all of the double bonds in the polybutadiene portion is hydrogenated. The wording "styrene-isoprene-styrene block copolymer (SIS) containing epoxy groups" as used herein means block copolymer in which polyisoprene block containing epoxy groups is sandwiched by two polystyrene blocks, and may be the block copolymer, of which a portion or all of the double bonds in the polyisoprene portion is hydrogenated.

An epoxy group content in the epoxidized SBS or epoxidized SIS is within the range of 0.05 to 10% by weight, preferably 0.2 to 5% by weight, based on the weight of the copolymer. When the epoxy group content is smaller than 0.05% by weight, the reaction of the epoxy group with a free carboxyl group in the ionomer resin decreases, and the dispersibility of the epoxidized SBS or epoxidized SIS in the ionomer resin is degraded. Therefore the durability of the resulting golf ball is degraded. On the other hand, when the epoxy group content is larger than 10% by weight, the reaction of the epoxy group with a free carboxyl group in the ionomer resin largely increases, and the flowability is poor, which degrades the moldability of the golf ball.

Examples of the epoxidized SBS or epoxidized SIS include styrene-butadiene-styrene block copolymer (SBS) comprising polybutadiene block containing epoxy groups commercially available from Daicel Chemical Industries, Ltd. under the trade name of "Epofriend" (such as "Epofriend A1010" and the like). Examples of the SEBS or SEPS having terminal OH groups are commercially available from Kuraray Co., Ltd. under the trade name of "Septon" (such as "Septon HG-252").

The inventors of the present invention discovered that the resulting golf ball has excellent physical properties of the cover and excellent golf ball performance, particularly high coefficient of restitution by employing polymer alloys of
  olefin; and
  styrene-butadiene-styrene block copolymer (SBS), the hydrogenation product of the SBS, styrene-isoprene-styrene block copolymer (SIS), the hydrogenation product of the SIS, styrene-isoprene-butadiene-styrene block copolymer (SIBS), or the hydrogenation product of the SIBS, in the styrene-based thermoplastic elastomer as the (c) component of the cover.

It is considered as one of the reasons that the olefin component in the polymer alloy, contributes to the compatibility of the cover composition. Particularly preferred is polymer alloy obtained by blending hydrogenated SBS (SEBS) commercially available from Shell Chemical Co. as a base polymer and the other polymer at the molecular level. The preferred other polymer is polyolefins formed by polymerizing olefins having 2 to 10 of carbon atoms.

The term "polymer alloy" as used herein refers to multi-component based polymer, which is obtained by mixing or chemically bonding two or more polymers, and macroscopically shows homogeneous phase because one polymer is properly dispersed in the other polymer. As the case may be, the polymer alloy microscopically shows uniform structure, or heterogeneous structure because one polymer phase is dispersed in the other polymer phase. Since the multi-component polymer in the above state has new physical properties in addition to average properties derived from component polymers, it has widely used for modifying resin, rubber and the like.

Examples thereof include the polymer alloy commercially available from Mitsubishi Chemical Co., Ltd. under the trade name of "Rabalon" (such as "Rabalon SJ4400N", "Rabalon SJ5400N", "Rabalon SJ6400N", "Rabalon SJ7400N", "Rabalon SJ8400N", "Rabalon SJ9400N", "Rabalon SR04" and the like).

It is desired for the styrene-based thermoplastic elastomer as the (c) component to have a Shore A hardness of not more than 95, preferably not more than 80. When the hardness is larger than 95, it is difficult to soften the cover.

In the golf ball of the present invention, it is required for the cover composition to comprise 10 to 80 parts by weight of the (a) component, 0 to 60 parts by weight of the (b) component and 5 to 60 parts by weight of the (c) component, based on 100 parts by weight of the base resin. The amount of the (a) component is preferably 20 to 70 parts by weight, more preferably 30 to 60 parts by weight. The amount of the (b) component is preferably 5 to 50 parts by weight, more preferably 10 to 40 parts by weight. The amount of the (c) component is preferably 10 to 50 parts by weight, more preferably 15 to 40 parts by weight. The (a) to (c) components has good compatibility by blending them at the above composition ratio, and they can be blended at the molecular level to form so-called polymer alloy. Therefore excellent physical properties such as hardness, strength and impact resilience, which have not obtained by conventional blend system, can be obtained. In the result, it is possible to soften the cover, while maintaining excellent stiffness and impact resilience from the (a) component. Therefore, the shot feel, spin performance (controllability) and scuff resistance of the resulting golf ball can be improved. In the present invention, the (b) component is not always essential component, but the compatibility between the (a) and (c) components is promoted by blending the (b) component at the above composition ratio. Therefore, it is possible to soften the cover, while maintaining excellent strength and impact resilience, and the spin performance and shot feel are further improved.

In the golf ball of the present invention, the cover composition may optionally contain other thermoplastic elastomer in addition to the base resin. The amount of the other thermoplastic elastomer is not more than 10 parts by weight, preferably 1 to 8 parts by weight, based on the 100 parts by weight of the base resin. When the amount is larger than 10 parts by weight, the compatibility of each material in the cover composition is degraded, and the scuff resistance is poor.

Examples of the other thermoplastic elastomers include polyolefin-based thermoplastic elastomer, polyurethane-based thermoplastic elastomer, polyester-based thermoplastic elastomer, polyamide-based thermoplastic elastomer, and mixtures thereof. Concrete examples of the other thermoplastic elastomers include polyolefin-based thermoplastic elastomer, which is commercially available from Mitsui Chemical Co., Ltd. under the trade name of "Milastomer" (such as "Milastomer M4800NW"); polyolefin-based thermoplastic elastomer, which is commercially available from Sumitomo Chemical Co., Ltd. under the trade name of "Sumitomo TPE" (such as "Sumitomo TPE3682" and "Sumitomo TPE9455"); polyurethane thermoplastic elastomer, which is commercially available from Kuraray Co., Ltd. under the trade name of "Kuramilon" (such as "Kuramilon 9195" and "Kuramilon 9180"); polyurethane-based thermoplastic elastomer, which is commercially available from BASF Polyurethane Elastomers Ltd. under the trade name of "Elastollan" (such as "Elastollan ET880" and "Elastollan ET890"); polyester-based thermoplastic elastomer, which is commercially available from Toray-Du Pont Co., Ltd. under the trade name of "Hytrel" (such as "Hytrel 4047", "Hytrel 4767", "Hytrel 5557"); polyamide-based thermoplastic elastomer, which is commercially available from Toray Co., Ltd. under the trade name of "Pebax" (such as "Pebax 4033SA", "Pebax 2533SA"); and the like.

In the golf ball of the present invention, the cover composition may optionally contain fillers (such as barium sulfate, calcium carbonate, etc.), pigments (such as titanium dioxide, etc.), and other additives (such as a dispersant, an antioxidant, a UV absorber, a photostabilizer and a fluorescent agent or a fluorescent brightener, etc.), in addition to the resin component, as long as the addition of the additives does not deteriorate the desired performance of the golf ball cover, but an amount of the pigment is preferably from 0.1 to 5.0 parts by weight, based on 100 parts by weight of the base resin for the cover.

The cover 3 of the present invention may be formed by conventional methods, which have been known to the art and used for forming the cover of the golf balls. For example, there can be used a method comprising molding the cover composition into a semi-spherical half-shell in advance, covering the core with the two half-shells, followed by pressure molding at 130 to 170° C. for 1 to 5 minutes, or a method comprising injection molding the cover composition directly on the core to cover it. At the time of molding the cover, many depressions called "dimples" are formed on the surface of the golf ball.

Furthermore, paint finishing or marking with a stamp may be optionally provided after the cover is molded.

EXAMPLES

The following Examples and Comparative Examples further illustrate the present invention in detail but are not to be construed to limit the scope of the present invention.

Production of Core (i) Production of Center

The rubber composition for the center having the formulation shown in Tables 1 and 2 was mixed, and then vulcanized by press-molding at 165° C. for 20 minutes in the mold to obtain spherical center. The weight, diameter, central point hardness and surface hardness of the resulting center were measured, and the results are shown in the same Tables.

(ii) Production of Two-layer Structured Core

The rubber composition for the intermediate layer having the formulation shown in Tables 1 and 2 was mixed, and coated on the center produced in the step (i) into a concentric sphere, and then vulcanized by press-molding at 165° C. for 20 minutes in the mold to obtain two-layer structured core having a diameter of 40.0 mm and weight of 38.7 g. The thickness and surface hardness of the resulting intermediate layer were measured, and the results are shown in the same Tables. The deformation amount of the resulting two-layer structured core was measured, and the results are shown in Tables 4 and 5.

TABLE 1

| Core | A | B | C | D | E |
|---|---|---|---|---|---|
| (Center) Composition (parts by weight) | | | | | |
| BR-11 *1 | 100 | 100 | 100 | 100 | 100 |
| Zinc acrylate | 6 | 9 | 15 | 3 | 25 |
| Zinc oxide | 5 | 5 | 5 | 5 | 5 |
| Barium sulfate | 22 | 21 | 18.5 | 23 | 14.5 |
| Dicumyl peroxide | 1 | 1 | 1 | 1 | 1 |
| Diphenyl disulfide | 0.5 | 0.5 | 0.5 | 0.5 | 0.5 |
| Weight (g) | 0.9 | 2.0 | 4.0 | 2.0 | 2.0 |
| Diameter (mm) | 12.0 | 15.0 | 19.0 | 15.0 | 15.0 |
| Central point hardness (JIS-A) | 48 | 72 | 81 | 25 | 91 |
| Surface hardness (JIS-A) | 52 | 76 | 85 | 28 | 95 |
| (Intermediate layer) Composition (parts by weight) | | | | | |
| BR-11 *1 | 100 | 100 | 100 | 100 | 100 |
| Zinc acrylate | 45 | 42 | 38 | 45 | 33 |
| Zinc oxide | 5 | 5 | 5 | 5 | 5 |
| Barium sulfate | 6 | 7.5 | 9 | 6 | 11 |
| Dicumyl peroxide | 0.5 | 0.5 | 0.5 | 0.5 | 0.5 |
| Thickness (mm) | 14.0 | 12.5 | 10.5 | 12.5 | 12.5 |
| Surface hardness (Shore D) | 67 | 65 | 62 | 67 | 60 |

TABLE 2

| Core | F | G | H | I |
|---|---|---|---|---|
| (Center) Composition (parts by weight) | | | | |
| BR-11 *1 | 100 | 100 | 100 | 100 |
| Zinc acrylate | 25 | 6 | 15 | 6 |
| Zinc oxide | 5 | 5 | 5 | 5 |
| Barium sulfate | 14.5 | 22 | 18.5 | 22 |
| Dicumyl peroxide | 1 | 1 | 1 | 1 |
| Diphenyl disulfide | 0.5 | 0.5 | 0.5 | 0.5 |
| Weight (g) | 2.0 | 0.3 | 6.2 | 0.9 |
| Diameter (mm) | 15.0 | 8.0 | 22.0 | 12.0 |
| Central point hardness (JIS-A) | 91 | 73 | 81 | 48 |
| Surface hardness (JIS-A) | 95 | 76 | 86 | 52 |
| (Intermediate layer) Composition (parts by weight) | | | | |
| BR-11 *1 | 100 | 100 | 100 | 100 |
| Zinc acrylate | 29 | 38 | 42 | 50 |
| Zinc oxide | 5 | 5 | 5 | 5 |
| Barium sulfate | 12.5 | 9 | 7.5 | 4 |
| Dicumyl peroxide | 0.5 | 0.5 | 0.5 | 1.0 |
| Thickness (mm) | 12.5 | 16.0 | 9.0 | 14.0 |
| Surface hardness (Shore D) | 48 | 62 | 65 | 73 |

*1 High-cis Polybutadiene rubber, commercially available from JSR Co., Ltd. under the trade name of "BR11" (Content of 1,4-cis-polybutadiene: 96%)

Preparation of Compositions for Cover

The formulation materials for the cover showed in Table 3 were mixed using a kneading type twin-screw extruder to obtain pelletized cover compositions. The extrusion condition was, a screw diameter of 45 mm,
a screw speed of 200 rpm, and
a screw L/D of 35.

The formulation materials were heated at 160 to 260° C. at the die position of the extruder.

TABLE 3

| Cover composition | (parts by weight) | | | | |
|---|---|---|---|---|---|
| | a | b | c | d | e |
| Hi-milan 1605 *2 | 20 | — | — | — | 50 |
| Hi-milan 1706 *3 | 20 | — | — | — | 50 |
| Hi-milan 1555 *4 | — | 35 | 40 | 45 | — |
| Hi-milan 1855 *5 | 10 | 35 | 40 | 45 | — |
| Rabalon SR04 *6 | 50 | 30 | 20 | 10 | — |
| Titanium dioxide | 4 | 4 | 4 | 4 | 4 |

*2: Hi-milan 1605 (trade name), ethylene-methacrylic acid copolymer ionomer resin obtained by neutralizing with sodium ion, manufactured by Du Pont Mitsui Polychemicals Co., Ltd.
*3: Hi-milan 1706 (trade name), ethylene-methacrylic acid copolymer ionomer resin obtained by neutralizing with zinc ion, manufactured by Du Pont Mitsui Polychemicals Co., Ltd.
*4: Hi-milan 1555 (trade name), ethylene-methacrylic acid copolymer ionomer resin obtained by neutralizing with sodium ion, manufactured by Du Pont Mitsui Polychemicals Co., Ltd.
*5: Hi-milan 1855 (trade name), ethylene-methacrylic acid-acrylic acid ester terpolymer ionomer resin obtained by neutralizing with zinc ion, manufactured by Du Pont Mitsui Polychemicals Co., Ltd.
*6: Rabalon SR04 (trade name), thermoplastic elastomer, which is polymer alloy of SEBS (styrene-ethylene-butylene-styrene block copolymer) and polypropylene, manufactured by Mitsubishi Chemical Co., Ltd.

Examples 1 to 3 and Comparative Examples 1 to 8

The resulting composition for the cover was covered on the resulting two-layer structured core by injection molding to form a cover layer having a thickness of 1.4 mm. The hardness of the resulting cover was measured, and the results are shown in Tables 4 and 5. Then, paint was applied on the surface to obtain golf ball having a diameter of 42.8 mm and weight of 45.3 g. The flight performance (initial velocity, spin amount and flight distance) and shot feel of the resulting golf balls were measured or evaluated. The results are shown in Tables 6 and 7. The test methods are as follows.

Test Method
(1) Hardness
(i) Hardness of the Center

A JIS-A hardness was measured at the central point and surface of the center. The surface hardness of the center was determined by measuring a hardness at the surface of the resulting center. The central point hardness of the center was determined by cutting the resulting center into two equal parts and then measuring a hardness at its central point in section. The JIS-A hardness was measured with a JIS-A hardness meter according to JIS K 6301.
(ii) Hardness of the Intermediate Layer The surface hardness of the intermediate layer was determined by measuring a Shore D hardness at the surface of the resulting two-layer structured core obtained by forming the intermediate layer on the center. The Shore D hardness was measured with a Shore D hardness meter according to ASTM-D2240.
(iii) Hardness of the Cover The hardness of the cover was determined by measuring a Shore D hardness at the surface of the golf ball, which was obtained by covering the cover on the core. The Shore D hardness was measured with a Shore D hardness meter according to ASTM-D2240.
(2) Deformation Amount of Core The deformation amount of core was determined by measuring a deformation amount when applying from an initial load of 98 N to a final load of 1275 N on the core.

(3) Flight Performance
(i) Flight Performance (1)

After a No. 1 wood club (a driver, W#1; "XXIO" loft angle=8 degrees, X shaft, manufactured by Sumitomo Rubber Industries, Ltd.) having metal head was mounted to a swing robot manufactured by Golf Laboratory Co. and a golf ball was hit at head speed of 50 m/sec, the spin amount (backspin) immediately after hitting and flight distance were measured. As the flight distance, total that is a distance to the stop point of the hit golf ball was measured. The measurement was conducted 12 times for each golf ball (n=12), and the average is shown as the result of the golf ball.
(ii) Flight Performance (2)

After a sand wedge (SW; "DP-601", manufactured by Sumitomo Rubber Industries, Ltd.) was mounted to a swing robot manufactured by Golf Laboratory Co. and a golf ball was hit at head speed of 21 m/sec, the spin amount (backspin) immediately after hitting was measured. The measurement was conducted 12 times for each golf ball (n=12), and the average is shown as the result of the golf ball.
(4) Shot Feel
(i) Shot Feel (1)

The shot feel of the golf ball is evaluated by 10 golfers according to a practical hitting test using a No. 1 wood club (W#1, a driver) having a metal head. The evaluation criteria are as follows. The results shown in the Tables below are based on the fact that the most golfers evaluated with the same criterion about shot feel.
Evaluation Criteria (Impact Force)

o: The golfers felt that the golf ball has good shot feel such that the impact force at the time of hitting is small.

Δ: The golfers felt that the golf ball has fairly good shot feel.

x: The golfers felt that the golf ball has poor shot feel such that the impact force at the time of hitting is large.
(ii) Shot Feel (2)

The shot feel of the golf ball is evaluated by 10 golfers according to a practical hitting test using a No. 1 wood club (W#1, a driver) having a metal head. The evaluation criteria are as follows. The results shown in the Tables below are based on the fact that the most golfers evaluated with the same criterion about shot feel.
Evaluation Criteria (Rebound Characteristics)

o: The golfers felt that the golf ball has good shot feel such that the rebound characteristics are good.

Δ: The golfers felt that the golf ball has fairly good shot feel.

x: The golfers felt that the golf ball has heavy and poor shot feel such that the rebound characteristics are poor.
(Test Results)

TABLE 4

| | Example No. | | | Comparative Example No. | | |
|---|---|---|---|---|---|---|
| Test item | 1 | 2 | 3 | 1 | 2 | 3 |
| Core composition (Center) | A | B | C | D | E | F |
| Weight (g) | 0.9 | 2.0 | 4.0 | 2.0 | 2.0 | 2.0 |
| Diameter (mm) | 12.0 | 15.0 | 19.0 | 15.0 | 15.0 | 15.0 |
| Central point hardness (JIS-A) | 48 | 72 | 81 | 25 | 91 | 91 |
| Surface hardness (JIS-A) | 52 | 76 | 85 | 28 | 95 | 95 |

TABLE 4-continued

|  | Example No. | | | Comparative Example No. | | |
| --- | --- | --- | --- | --- | --- | --- |
| Test item | 1 | 2 | 3 | 1 | 2 | 3 |
| (Intermediate layer) | | | | | | |
| Thickness (mm) | 14.0 | 12.5 | 10.5 | 12.5 | 12.5 | 12.5 |
| Surface hardness (Shore D) | 67 | 65 | 62 | 67 | 60 | 48 |
| (Core) | | | | | | |
| Deformation amount (mm) | 3.00 | 2.90 | 2.80 | 3.50 | 2.35 | 2.80 |
| (Cover) | | | | | | |
| Composition | d | c | b | d | b | c |
| Hardness (Shore D) | 60 | 55 | 50 | 60 | 50 | 55 |

TABLE 5

|  | Comparative Example No. | | | | |
| --- | --- | --- | --- | --- | --- |
| Test item | 4 | 5 | 6 | 7 | 8 |
| Core composition (Center) | G | H | I | C | A |
| Weight (g) | 0.3 | 6.2 | 0.9 | 4.0 | 0.9 |
| Diameter (mm) | 8.0 | 22.0 | 12.0 | 19.0 | 12.0 |
| Central point hardness (JIS-A) | 73 | 81 | 48 | 81 | 48 |
| Surface hardness (JIS-A) (Intermediate layer) | 76 | 86 | 52 | 85 | 52 |
| Thickness (mm) | 16.0 | 9.0 | 14.0 | 10.5 | 14.0 |
| Surface hardness (Shore D) (Core) | 62 | 65 | 73 | 62 | 67 |
| Deformation amount (mm) (Cover) | 2.95 | 3.40 | 2.60 | 2.80 | 3.00 |
| Composition | c | c | b | a | e |
| Hardness (Shore D) | 55 | 55 | 50 | 39 | 71 |

TABLE 6

|  | Example No. | | | Comparative Example No. | | |
| --- | --- | --- | --- | --- | --- | --- |
| Test item | 1 | 2 | 3 | 1 | 2 | 3 |
| (Golf ball) Flight performance (1); W#1, 50 m/sec | | | | | | |
| Initial velocity (m/sec) | 72.1 | 72.0 | 71.9 | 71.2 | 72.2 | 72.0 |
| Spin amount (rpm) | 2450 | 2400 | 2420 | 2210 | 2680 | 2600 |
| Total (m) | 264.4 | 266.5 | 265.0 | 252.0 | 258.5 | 258.0 |
| Flight performance (2); SW, 21 m/sec | | | | | | |
| Spin amount (rpm) | 6870 | 6890 | 6920 | 6720 | 6980 | 6870 |
| Shot feel (1) (Impact) | ○ | ○ | ○ | ○ | x | ○ |
| Shot feel (2) (Rebound) | Δ | Δ | Δ | x | Δ | Δ |

TABLE 7

|  | Comparative Example No. | | | | |
| --- | --- | --- | --- | --- | --- |
| Test item | 4 | 5 | 6 | 7 | 8 |
| (Golf ball) Flight performance (1); W#1, 50 m/sec | | | | | | 
| Initial velocity (m/sec) | 72.3 | 71.4 | 72.0 | 71.3 | 72.5 |
| Spin amount (rpm) | 2610 | 2300 | 2680 | 2560 | 2260 |
| Total (m) | 260.0 | 254.0 | 255.3 | 252.5 | 268.0 |
| Flight performance (2); SW, 21 m/sec | | | | | |
| Spin amount (rpm) | 6950 | 6780 | 7010 | 7070 | 5200 |
| Shot feel (1) (Impact) | x | ○ | x | ○ | x |
| Shot feel (2) (Rebound) | Δ | x | Δ | x | ○ |

As is apparent from Tables 4 to 7, the three-piece solid golf balls of the present invention of Examples 1 to 3 have good shot feel, long flight distance when hit by a driver, and excellent controllability by accomplishing high spin amount when hit by a short iron club and the like (a sand wedge) as compared with the conventional golf balls of Comparative Examples 1 to 8.

On the other hand, in the golf ball of Comparative Example 1, since the hardness of the center is low, the initial velocity when hit by a driver is small, which reduces the flight distance. In addition, the shot feel is heavy and poor such that the rebound characteristics are poor. In the golf ball of Comparative Example 2, since the hardness of the center is high, the spin amount when hit by a driver is large, which reduces the flight distance. In addition, the shot feel is poor such that the impact force at the time of hitting is large.

In the golf ball of Comparative Example 3, since the hardness of the center is high and the surface hardness of the intermediate layer is low, the spin amount when hit by a driver is large, which reduces the flight distance. In the golf ball of Comparative Example 4, since the diameter of the center is small, the spin amount when hit by a driver is large, which reduces the flight distance. In addition, the shot feel is poor such that the impact force at the time of hitting is large.

In the golf ball of Comparative Example 5, since the diameter of the center is large, the initial velocity when hit by a driver is small, which reduces the flight distance. In addition, the shot feel is heavy and poor such that the rebound characteristics are poor. In the golf ball of Comparative Example 6, since the surface hardness of the intermediate layer is high, the spin amount when hit by a driver is large, which reduces the flight distance. In addition, the shot feel is poor such that the impact force at the time of hitting is large.

In the golf ball of Comparative Example 7, since the hardness of the cover is low, the initial velocity when hit by a driver is small, which reduces the flight distance. In the golf ball of Comparative Example 8, since the hardness of the cover is high, the flight distance when hit by a driver is long, but the spin amount when hit by a sand wedge is small, which degrades the controllability. In addition, the shot feel is poor such that the impact force at the time of hitting is large.

What is claimed is:

1. A three-piece solid golf ball comprising a core composed of a center and an intermediate layer formed on the center, and a cover formed on the core, wherein the center has a diameter of 10 to 20 mm and a central point hardness in JIS-A hardness of 30 to 90;

the intermediate layer has a surface hardness in Shore D hardness of 50 to 70 and a thickness of 9.5 to 15.0 mm; and the cover has a Shore D hardness of 45 to 65 wherein the cover is formed from a cover composition comprising as a base resin a heated mixture of
- (a) ionomer resin; and
- (b) thermoplastic elastomer selected from the group consisting of styrene-based thermoplastic elastomer, polyolefin-based thermoplastic elastomer, polyurethane-based thermoplastic elastomer, polyester-based thermoplastic elastomer, polyamide-based thermoplastic elastomer and mixtures of at least one thereof.

2. The three-piece solid golf ball according to claim 1, wherein the cover is formed from a cover composition comprising
- (a) 10 to 80 parts by weight of ethylene-(meth)acrylic acid copolymer ionomer resin,
- (b) 0 to 60 parts by weight of ethylene-(meth)acrylic acid-(meth)acrylic ester terpolymer ionomer resin, and
- (c) 5 to 60 parts by weight of styrene-based thermoplastic elastomer, based on 100 parts by weight of a base resin.

3. The three-piece solid golf ball according to claim 2, wherein component (a) is present in an amount of 20 to 70 parts by weight, component (b) is present in an amount of 5 to 50 parts by weight, and component (c) is present in an amount of 10 to 50 parts by weight.

4. The three-piece solid golf ball according to claim 2, wherein component (a) is present in an amount of 30 to 60 parts by weight, component (b) is present in an amount of 10 to 40 parts by weight, and component (c) is present in an amount of 15 to 40 parts by weight.

5. The three-piece solid golf ball according to claim 1, wherein the styrene-based thermoplastic elastomer is selected from the group consisting of styrene-butadiene-styrene block copolymer (SBS); styrene-isoprene-styrene block copolymer (SIS); styrene-isoprene-butadiene-styrene block copolymer (SIBS); hydrogenation product thereof; and a polymer alloy of an olefin therewith.

6. The three-piece solid golf ball according to claim 1, wherein the center has a surface hardness in JIS-A hardness of 30 to 95.

7. The three-piece solid golf ball according to claim 1, wherein the center has a diameter of 12 to 19 mm and a central point hardness in JIS-A hardness of 35 to 88;

the intermediate layer has a surface hardness in Shore D hardness of 52 to 68 and a thickness of 10.5 to 14.0 mm; and the cover has a Shore D hardness of 47 to 63.

8. The three-piece solid golf ball according to claim 1, wherein the center has a diameter of 14 to 16 mm and a central point hardness in JIS-A hardness of 48 to 81;

the intermediate layer has a surface hardness in Shore D hardness of 62 to 67 and a thickness of 11.0 to 13.0 mm; and the cover has a Shore D hardness of 50 to 60.

9. The three-piece solid golf ball according to claim 1, wherein the center has a surface hardness in JIS-A hardness of 50 to 85.

10. The three-piece solid golf ball according to claim 1, wherein the core has a diameter of 37 to 43 mm and deforms an amount in the range of 2.4 to 3.6 mm when applying an initial load of 98 N to a final load of 1275 N.

11. The three-piece solid golf ball according to claim 1, wherein the core has a diameter of 39 to 41 mm and deforms an amount in the range of 2.8 to 3.2 mm when applying an initial load of 98 N to a final load of 1275 N.

* * * * *